United States Patent [19]

Kakinuma

[11] Patent Number: 5,042,774
[45] Date of Patent: Aug. 27, 1991

[54] MULTI-AXES TYPE ROBOT

[75] Inventor: Takekazu Kakinuma, Tokyo, Japan

[73] Assignee: Sony Corporation, Tokyo, Japan

[21] Appl. No.: 458,565

[22] Filed: Dec. 28, 1989

[30] Foreign Application Priority Data

Jan. 23, 1989 [JP] Japan .................................. 1-13349

[51] Int. Cl.$^5$ .............................................. B25J 17/00
[52] U.S. Cl. .................................... 248/664; 248/122; 248/282; 414/744.5
[58] Field of Search ............... 248/664, 282, 122, 124, 248/289.1; 414/744.2, 744.4, 744.5; 901/15

[56] References Cited

U.S. PATENT DOCUMENTS

| | | | |
|---|---|---|---|
| 1,611,305 | 12/1926 | Ellwood, Sr. ................... | 248/124 X |
| 2,317,971 | 5/1943 | Angell .............................. | 248/122 X |
| 2,644,660 | 7/1953 | Dudley ................................. | 248/282 |
| 3,524,510 | 8/1970 | Connell ........................... | 248/124 X |
| 3,817,249 | 6/1974 | Nicholson ........................ | 248/124 X |
| 4,343,391 | 8/1982 | Skrypek et al. ............... | 414/744.5 X |
| 4,552,504 | 11/1985 | Nakada . | |
| 4,637,776 | 1/1987 | Saleto ........................... | 414/744.5 X |
| 4,706,515 | 11/1987 | Yasukawa ........................ | 901/15 X |

FOREIGN PATENT DOCUMENTS

| | | |
|---|---|---|
| 0092358 | 10/1983 | European Pat. Off. . |
| 0249133 | 6/1987 | European Pat. Off. . |
| 1089684 | 9/1966 | Fed. Rep. of Germany ... 414/744.5 |
| 2301423 | 7/1974 | Fed. Rep. of Germany . |
| 3323976 | 9/1984 | Fed. Rep. of Germany . |
| 2590337 | 5/1987 | France . |
| 8503662 | 8/1985 | PCT Int'l Appl. . |
| 8910240 | 4/1989 | PCT Int'l Appl. . |
| 2177676 | 1/1987 | United Kingdom . |

*Primary Examiner*—Alvin C. Chin-Shue
*Attorney, Agent, or Firm*—Lewis H. Eslinger; Jay H. Maioli; Donald S. Dowden

[57] ABSTRACT

A multi-axes robot includes a stationary base and one or more detachable arm units. Each of the detachable arm units comprises a pivotal base detachably mounted on the stationary base, and a first arm pivotably supported on the pivotal base, a second arm pivotably mounted on a free end of the first arm, and a tool mounting shaft supported on a free end of the second arm. The angular orientation of the arm units with respect to the stationary base and to each other may be optimally adjusted, so as to select suitable working ranges for each of the arm units and define cooperative working ranges for a plurality of arm units.

6 Claims, 10 Drawing Sheets

MULTI-AXES TYPE ROBOT

BACKGROUND OF THE INVENTION

1. Field of the Invention

The present invention relates generally to a multi-axes type robot which includes at least one arm unit having a plurality of pivotal axes. More specifically, the invention relates to a multi-axes type robot which has at least one arm unit comprising a pivotal base or shoulder member, a first pivotal arm pivotably supported on the shoulder member, and a second pivotal arm pivotably supported on the first pivotal arm at a free end thereof.

2. Description of the Prior Art

In recent years, various industrial robots have been used for processing various materials, such as the manufacturing of parts, or the assembling of apparatus. An example of such an industrial robot is a multi-axes type robot which includes an arm unit having a plurality of pivotal axes. Such a robot is basically comprised of a stationary base on which a mounting portion is mounted at a predetermined position, a first pivotal arm which is pivotably supported on the stationary base, a second pivotal arm which is pivotably supported on the free end of the first pivotal arm, a tool mounting shaft supported on the free end of the second pivotal arm and a drive mechanism for driving the tool mounting shaft.

In the assembly of an apparatus, various kinds of operations are usually performed on an assembly line. Therefore, if the different operations on the assembly line are performed by industrial robots, the line requires a plurality of robots. As a result, the overall length of the line becomes very long, and the installation cost thereof becomes very high.

In addition, although there is an advantage in that the aforementioned multi-axes robot can be compact, it is difficult to pre-mount a plurality of tools on the robot. Therefore, there are disadvantages in that the tool mounted on the robot must be changed whenever a line operation is altered, thereby reducing operating efficiency.

In order to overcome the aforementioned disadvantages, there has been proposed an improved, multi-arm type, multi-axes robot on which a plurality of tools can be mounted and which can tools can selectively or simultaneously be driven by the robot. This robot generally comprises an essentially cylindrical stationary base, and two arm units pivotably supported on the stationary base. Utilizing such a robot, the whole length of an assembly line can be reduced. However, since the respective arms are mounted on the stationary base at predetermined positions, the working range of each arm is fixed, meaning that the cooperative working range of the arms is fixed. Therefore, in a case where the working range of any of the arms or the cooperative working range between the arms needs to be changed in order to facilitate a change in line operation, another robot must be arranged on the line.

OBJECT AND SUMMARY OF THE INVENTION

It is therefore a principal object of the present invention to eliminate the aforementioned disadvantages and to provide a multi-axes robot which can optionally alter the working ranges of its arms and thereby, its cooperative working range.

In order to accomplish the aforementioned and other objects, a multi-axes robot includes at least one pivotal base which is detachably connected to a stationary base and which is pivotably mounted to an arm unit.

According to a first aspect of the present invention, a robot is comprised of:

a stationary base on which an arm unit having a working end is mounted.

The working end is equipped with a tool for performing a predetermined operation at a predetermined working position. and The arm unit has a pivotal base detachably connected to the stationary base, a first arm member having one end pivotably supported on the pivotal base, and a second arm member pivotably supported on a free end of the first arm member. The working end of the arm unit being supported on a free end of the second arm member.

The angular orientation of the arm unit with respect to the axis of the stationary base may be optionally adjusted. The first arm member may be pivotable about an essentially vertical first axis extending through an axis of the stationary base, and the second arm member may be pivotable about an essentially vertical second axis. The first arm member when pivoted preferably moves in an essentially horizontal direction by a predetermined angle to form a working position for the working end. The working position of the arm unit may be changed by adjusting the orientation of the arm unit with respect to the axis of the stationary base. The stationary base preferably has a plurality of engaging portions on the upper surface thereof at regular intervals, and the pivotal base of the arm unit has preferably a plurality of engaging portions on the lower surface thereof at the same regular intervals as that of the stationary base. The engaging portions of the pivotal base of the arm unit may respectively engage with the corresponding engaging portions of the stationary base, so that the arm unit may be connected to the stationary base at a plurality of angular orientations. An annular space extending about the axis of the stationary base is preferably formed within the interface between the pivotal base of the arm unit and the stationary base.

According to another aspect of the invention, a robot is comprised of:

a stationary base and first and second working ends, each equipped with a tool for performing a predetermined operation at a predetermined working position.

a first arm unit for supporting the first working end being supported on the stationary base and a second arm unit supporting the second working end being supported on the first arm unit;

each of the first and second arm units has a pivotal base, a first arm member having one end pivotably supported on the pivotal base, a second arm member having one end pivotably supported on a free end of the first arm member. The working end of the arm unit being supported on a free end of the second arm member. The pivotal base of the first arm unit being detachably connected to the stationary base and the pivotal base of the second arm unit being detachably connected to the pivotal base of the first arm unit.

The angular orientation of the first arm unit with respect to the axis of the stationary base and of the second arm unit with respect to the first arm unit is adjustable so that the working ranges of each of the first and second arm units may be changed, thereby changing the cooperative working range defined by the overlap of the working ranges of the first and second arm units. The first arm members of the first and second arm units may be respectively pivotable about an essentially vertical first axis extending through an axis of the stationary base, and the second arm members of the first and second arm units are pivotable about respective, essentially vertical, second and third axes. The first arm members of the first and second arm units are respectively pivotable in an essentially horizontal direction by a predetermined angle, and the working position of each of the first and second arm units may be changed by adjusting the angular orientation of each of the first and/or second arm units about the axis thereof. The stationary base has preferably a plurality of engaging portions on the upper surface thereof at regular intervals, and the pivotal base of the first arm unit has preferably a plurality of engaging portions on the lower surface thereof at the same regular intervals as those of the stationary base. The engaging portions of the lower surface of the pivotal base of the first arm unit may be engaged with corresponding engaging portions of the stationary base, so that the first arm unit may be connected to the stationary base at a plurality of angular orientations. In addition, the pivotal base of the first arm unit preferably also has a plurality of engaging portions on the upper surface thereof at regular intervals, and the pivotal base of the second arm unit has preferably a plurality of engaging portions on the lower surface thereof at the same regular intervals as those of the first arm unit. The engaging portions of the lower surface of the pivotal base of the second arm unit may be engaged with corresponding engaging portions of the upper surface of the pivotal base of the first arm unit, so that the second arm unit may be connected to the stationary base at a plurality of angular orientations. Annular spaces extending about the axis of the stationary base are preferably formed within the interfaces between the pivotal base of the first arm unit and the stationary base, and between the pivotal bases of the first and second arm units.

BRIEF DESCRIPTION OF THE DRAWINGS

The present invention will be understood more fully from the detailed description given herebelow and from the accompanying drawings of the preferred embodiment of the invention. The drawings however, are not intended to imply limitation of the invention to a specific embodiment, but are for explanation and understanding only.

In the drawings.

DESCRIPTION OF THE PREFERRED EMBODIMENTS

FIGS. 1 to 8 show the first preferred embodiment of a multi-axes type robot according to the present invention.

Referring now to the drawings, particularly to FIGS. 1 to 4, a multi-axes type robot 1 comprises a stationary base 2, a lower arm unit 3 and an upper arm unit 4. The lower arm unit 3 has a detachable pivotal base or lower shoulder member 5, first and second pivotal arms 6 and 7, and a tool mounting shaft 8. The lower shoulder member 5 is arranged on the upper surface of the stationary base 2 and is detachable from the latter. One end of the first pivotal arm 6 is pivotably supported on the lower shoulder member 5, and one end of the second pivotal arm 7 is pivotably supported on the free end of the first pivotal arm 6. The tool mounting shaft 8 is supported on the free end of the second pivotal arm 7 so as to be extendable and retractable along its axis.

Figure 1:
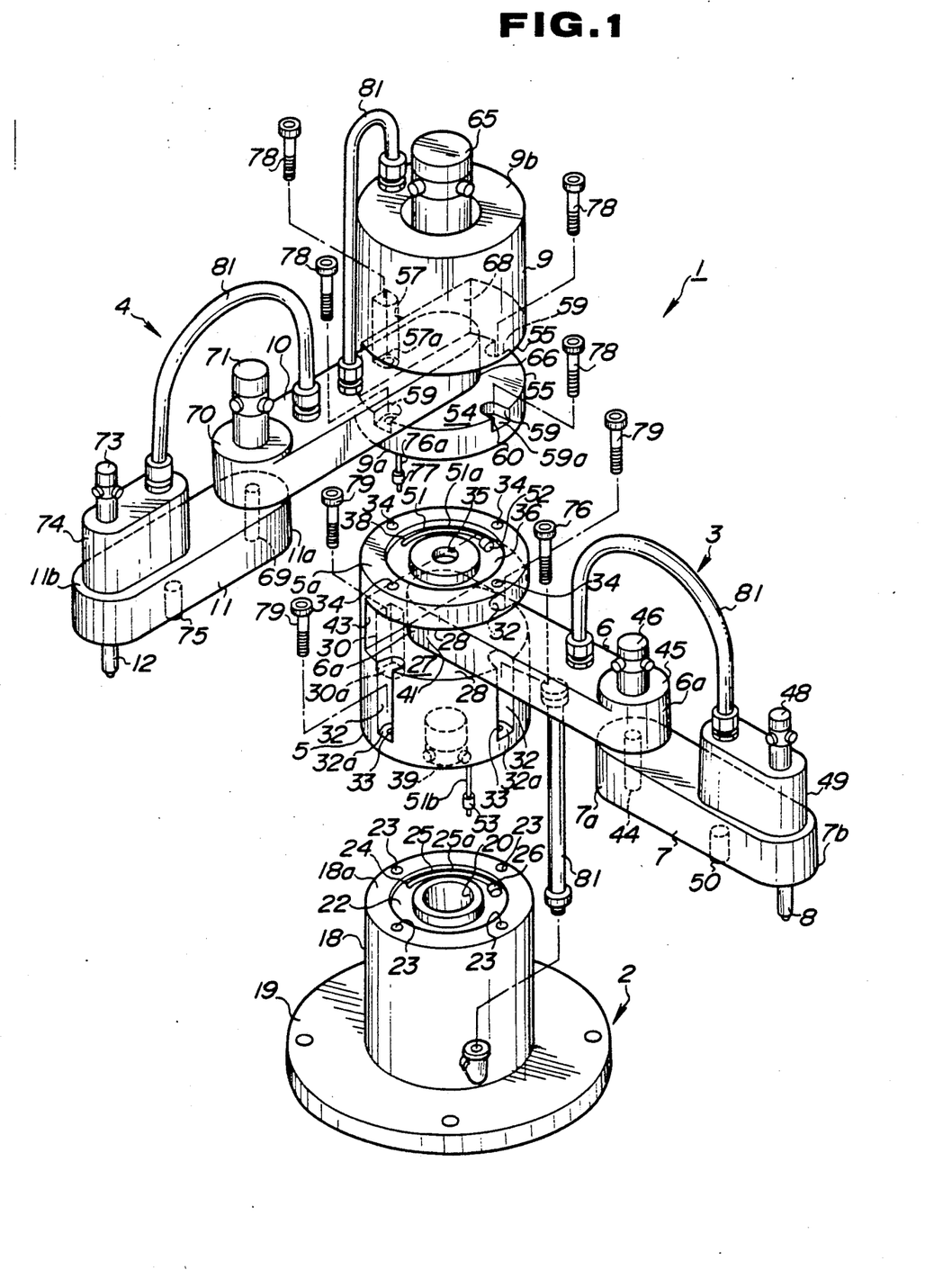
FIG. 1 is an exploded, perspective view of a first preferred embodiment of a multi-axes type robot according to the present invention, which illustrates an state in which the two arm units are detached from a stationary base.
Figure 4:
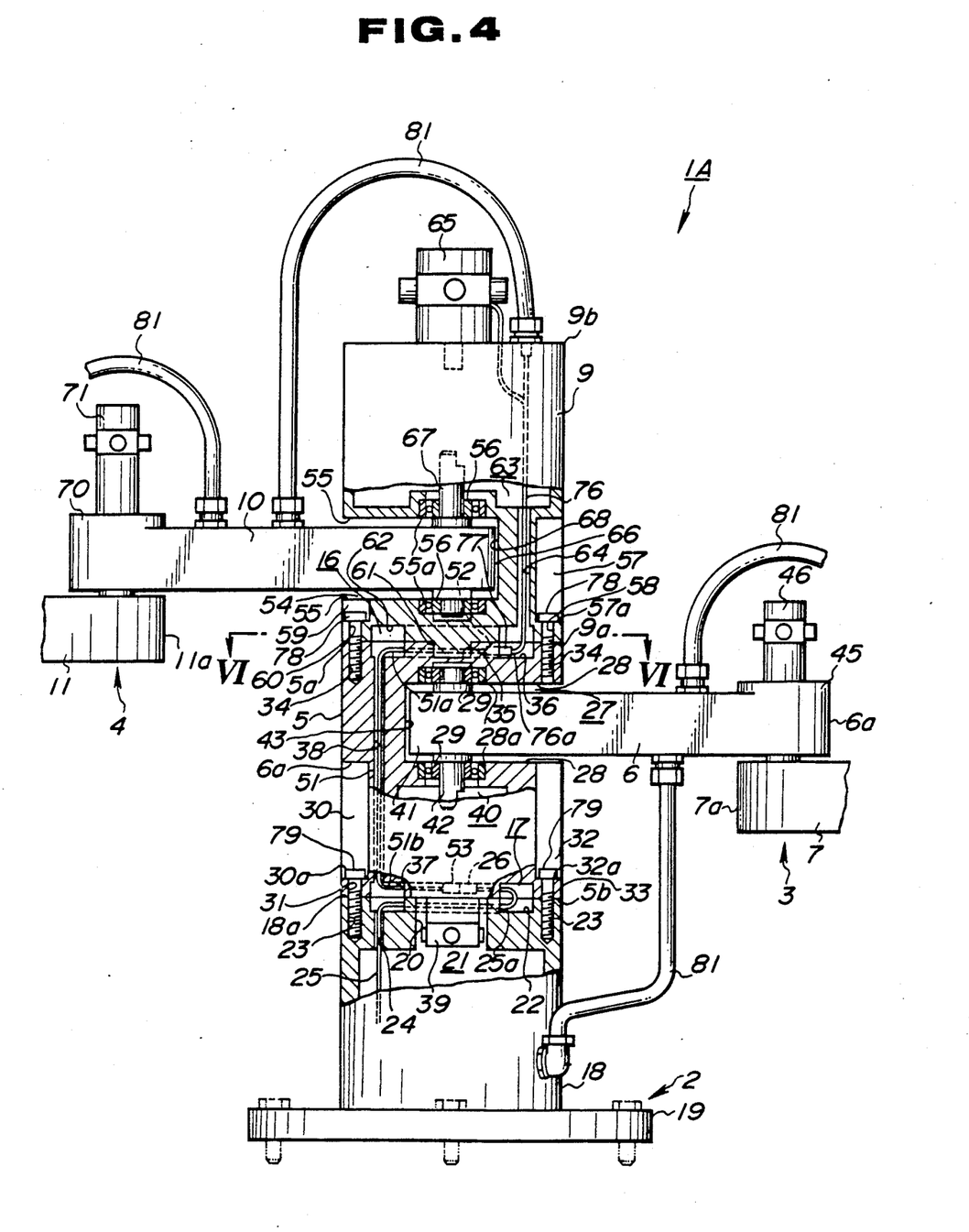
FIG. 4 is a partial sectional side view of the multi-axes type robot of FIG. 1, which illustrates an state in which two arm units are assembled and mounted to the stationary base.
Figure 5:
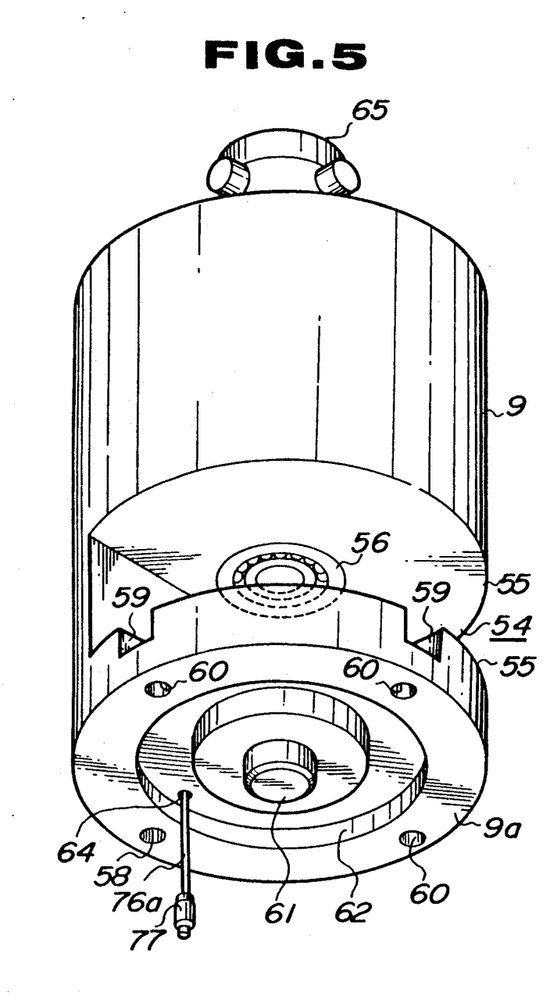
FIG. 5 is a perspective view of a shoulder member of the multi-axes robot of FIG. 1, viewed obliquely from the bottom.
Figure 6:
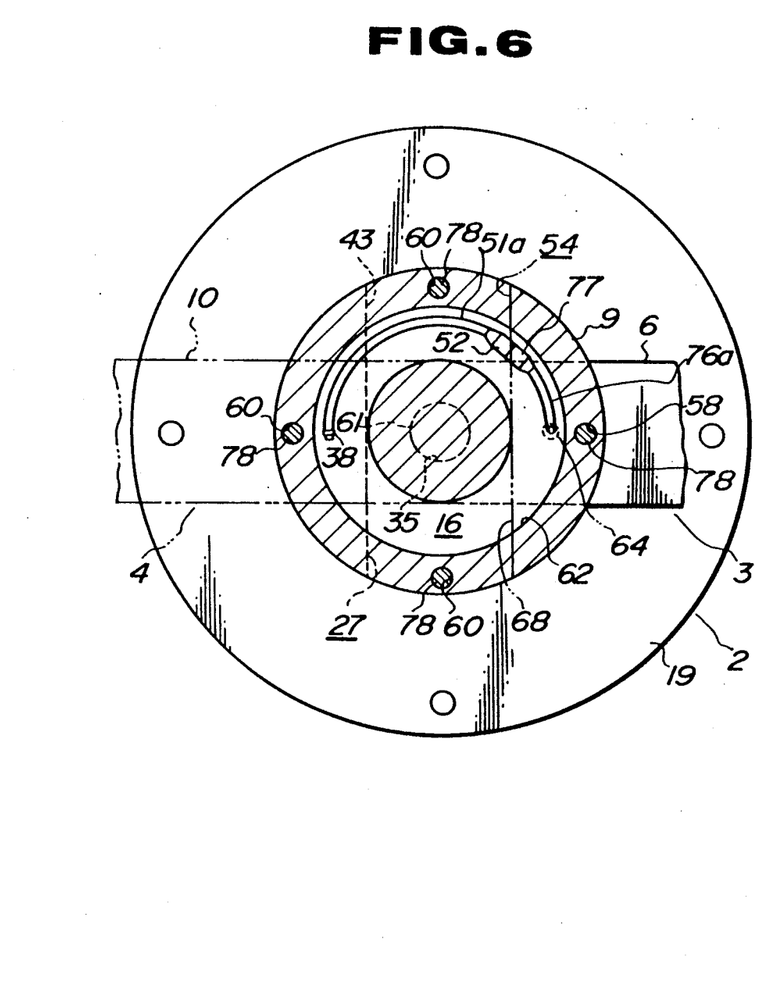
FIG. 6 is a sectional view of the multi-axes robot, taken along the section line 6—6 in FIG. 4.

Similarly, the upper arm unit 4 has a detachable pivotal base or upper shoulder member 9, first and second pivotal arms 10 and 11, and a tool mounting shaft 12. The upper shoulder member 9 is arranged on the upper surface of the lower shoulder member 5 of the lower arm unit 3, and is detachable from the latter. One end of the first pivotal arm 10 is pivotably supported on the upper shoulder member 9, and one end of the second pivotal arm 11 is pivotably supported on the free end of the first pivotal arm 10. The tool mounting shaft 12 is supported on the free end of the second pivotal arm 11 so as to be extendable and retractable along its axis.

Figure 2:
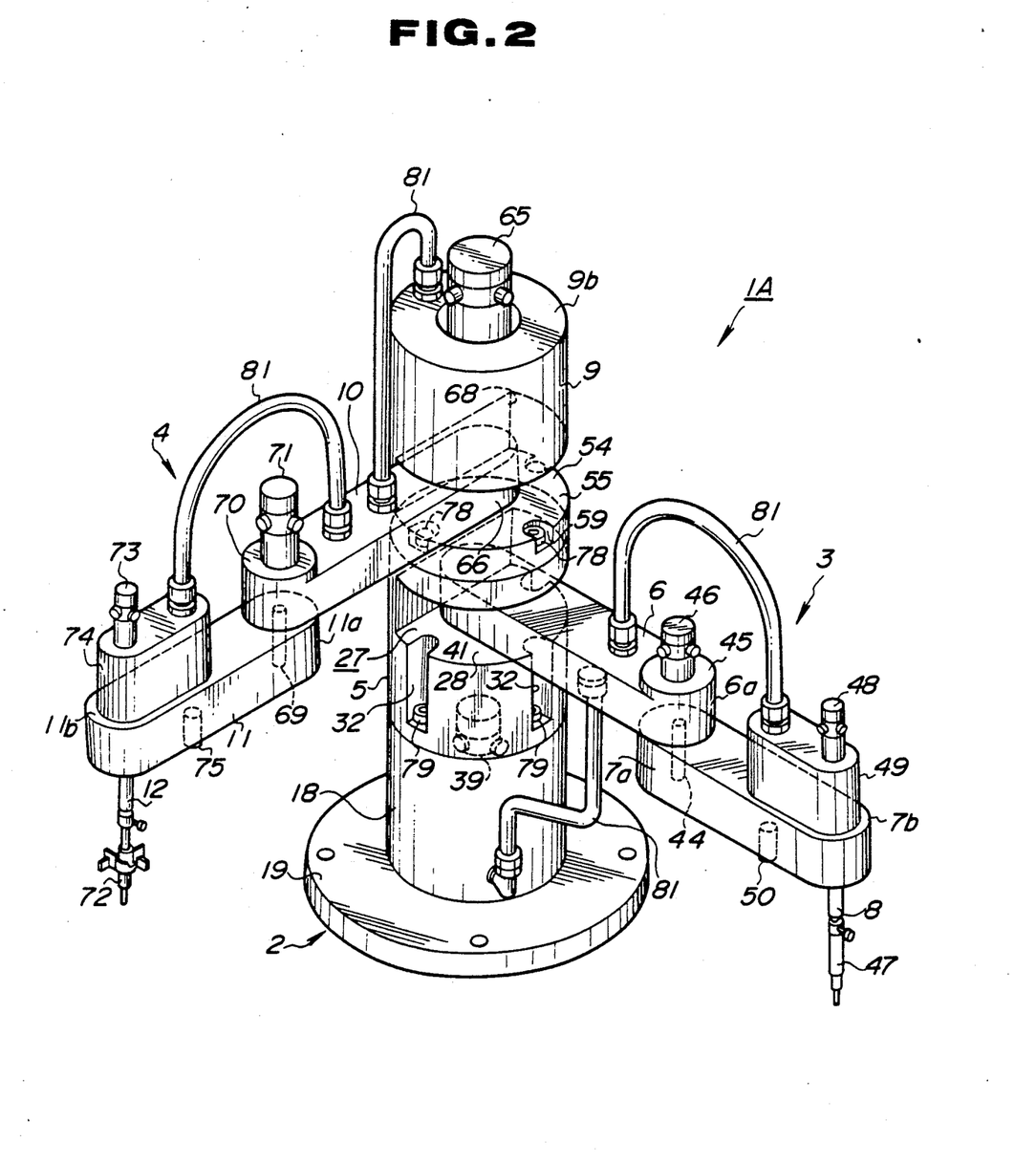
FIG. 2 is a perspective view of a multi-axes type robot of FIG. 1, which illustrates a state in which two arm units are mounted to the stationary base.
Figure 3A:
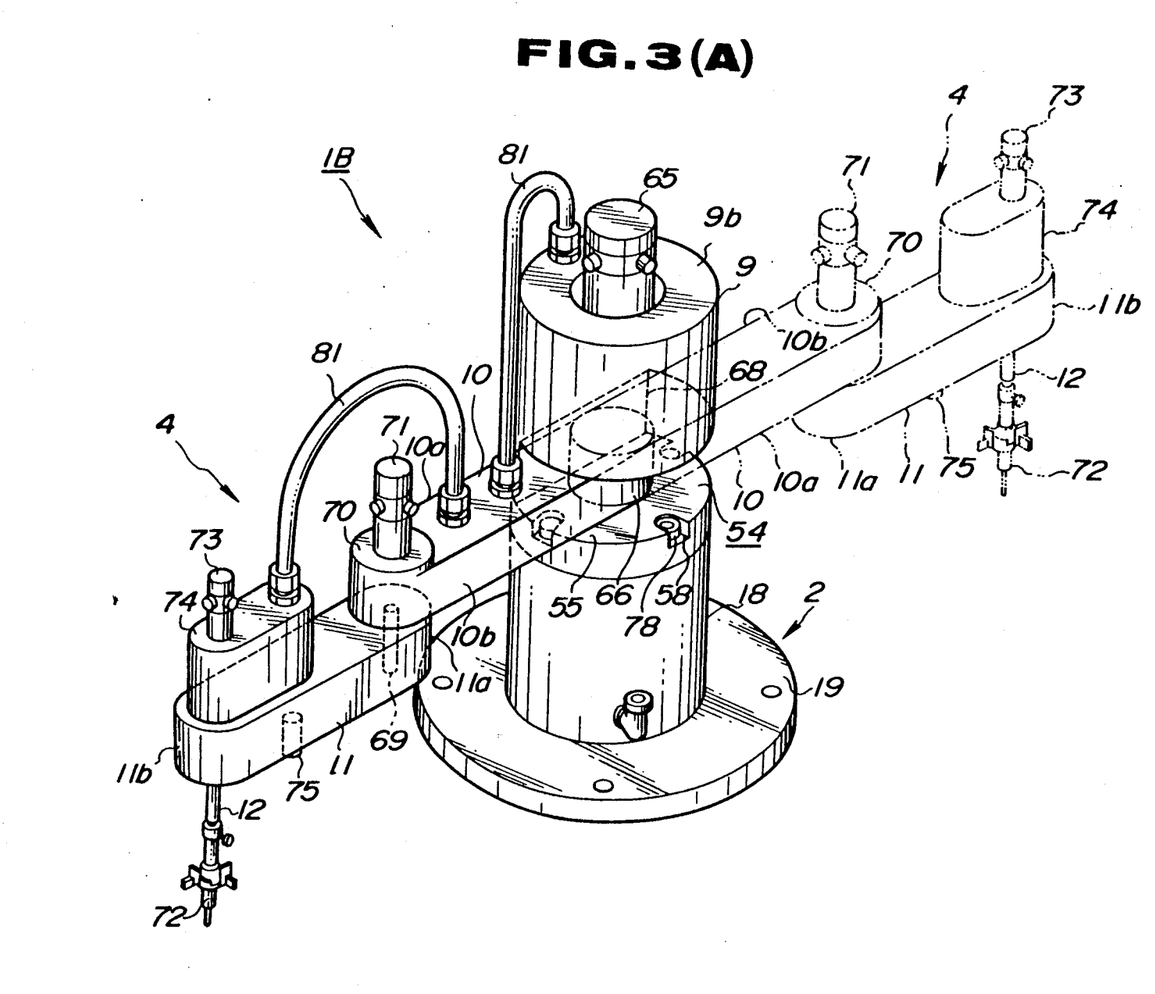
FIG. 3(A) is a perspective view of the multi-axes type robot of FIG. 1, illustrating a state in which the upper arm unit is mounted on the stationary base.
Figure 3B:
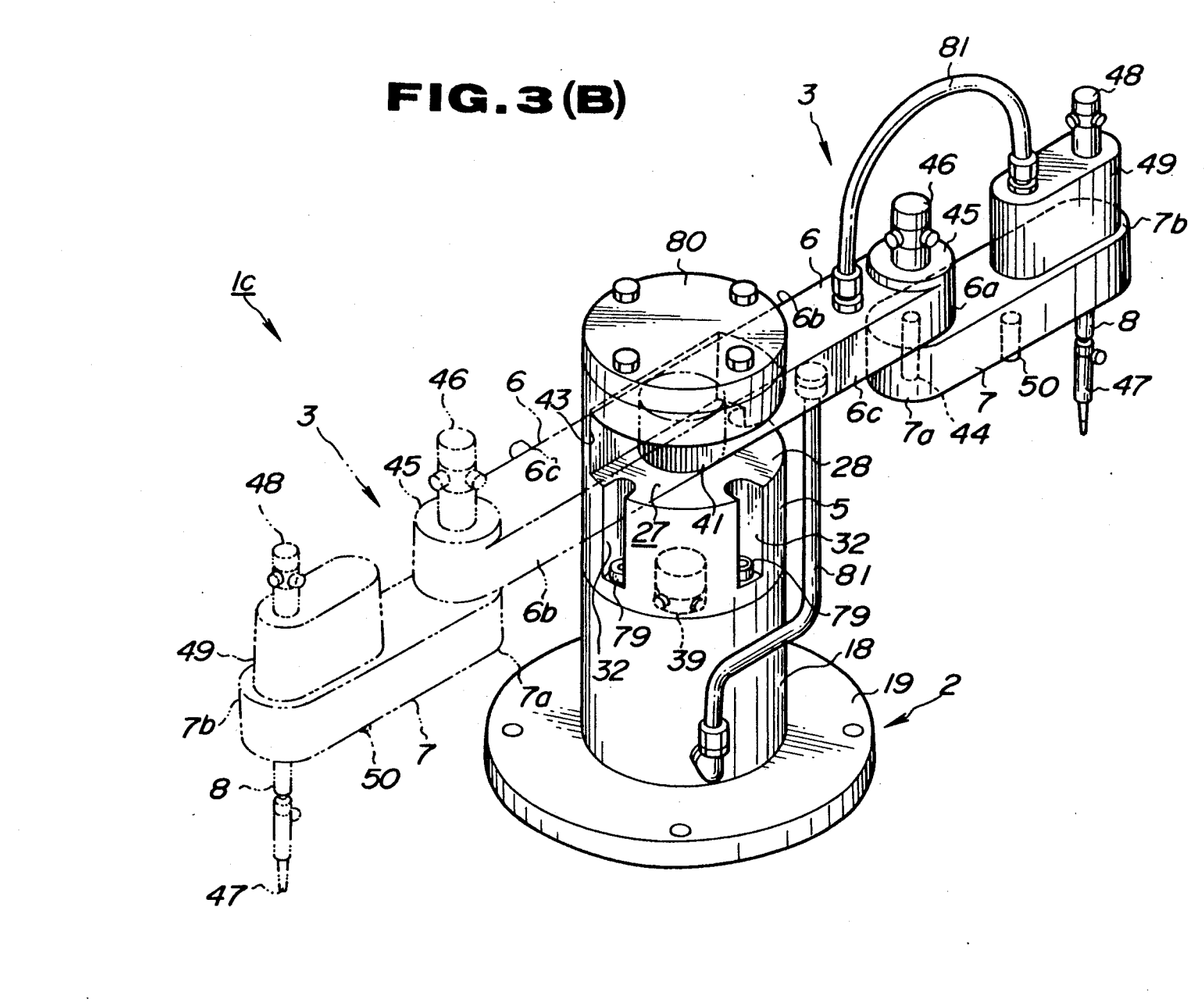
FIG. 3(B) is a perspective view of the multi-axes type robot of FIG. 1, which illustrates an state in which the lower arm unit is mounted on the stationary base.

As shown in FIG. 2, when the lower shoulder member 5 is secured to the stationary base 2 after the shoulder members 5 and 9 are connected to each other, a double-arm type robot 1A is assembled. In addition, as shown in FIG. 3(A) or 3(B), if one of shoulder members 5 or 9 is secured to the stationary base 2, a single arm type robot 1B or 1C is assembled.

In addition, the angular orientation of the upper arm unit 4 in relation to the lower arm unit 3 can be adjusted with respect to their common axis. As a result, in a double arm type robot 1A, the working regions of the two arm units 3 and 4 can differ from each other or a cooperative working region can be selectively set.

Furthermore, as shown in FIG. 4, the interfaces between the stationary base and the pivotal bases of the arm units are respectively designed to have annular spaces 16 and 17, extending about the axis. Annular space 16 is formed between arm units 3 and 4, when arm units 3 and 4 are mounted together on the stationary base 2, and annular space 17 is formed between the lower arm unit 3 and the stationary base 2, so that wires, cables or such, between various kinds of connecting members may be arranged therein.

In order to facilitate understanding of the preferred embodiments of the present invention, the following disclosure will be in terms of separate groups of components.

Structure of Stationary Base

The stationary base 2 is integrally formed and consists of (in FIG. 1) an essentially cylindrical main body portion 18 which has an axis extending vertically, and a flange-shaped fixture portion 19 which projects outwards from the bottom edge of the main body portion 18. An essentially cylindrical inner space 21 is formed within the greater part of the main body portion 18 except for the upper end portion thereof.

The main body portion 18 has an essentially cylindrical motor receiving opening 20, the upper end of which opens to the center of an upper end surface 18a of the main body portion 18, and the lower end of which is communicated with the cylindrical inner space of the main body portion 18. The main body portion 18 has also an essentially annular groove 22 which is formed in the upper end surface 18a between the periphery of the main body portion 18 and the motor receiving opening 20.

In addition, the main body portion 18 has four tapped holes 23 which open to the upper end surface 18a at locations near the periphery thereof at regular intervals and are used for mounting the arm unit/units 3 and 4 on the stationary base 2.

The main body portion 18 has also a through opening 24, which provides communication between the annular groove 22 and the inner space 21, for passing a connecting cable unit 25 through. The connecting cable unit 25 comprises a plurality of signal cables, actuating cables and so forth. One end of the connecting cable unit 25 passes through the through opening 24 to be connected to a control plate or trunk connector (not shown) arranged within the inner space 21, and the other end of the connecting cable unit 25 is provided with a connector 26.

Structure of Lower Arm Unit

The lower shoulder member 5 of the lower arm unit 3 is essentially cylindrical and has a similar height and diameter to that of the main body portion 18 of the stationary base 2. The lower shoulder member 5 has also a lower arm receiving groove 27 which has an essentially D-shaped cross section and which is arranged at a location near the upper surface of the lower shoulder member 5. As can be seen clearly from FIG. 4, a pair of essentially cylindrical bearing receiving recesses 28a are formed in the upper and lower surfaces 28 of the lower arm receiving groove 27, and a pair of ball bearings 29 are fixed in the bearing receiving recesses 28a.

The lower shoulder member 5 has also a vertically extending groove 30 which is formed on the periphery thereof at a location behind the lower arm receiving groove 27. The groove 30 is designed not to reach the upper and lower surfaces 5a and 5b of the lower shoulder member 5. The groove 30 has a bolt passing opening 31 which extends between the lower surface 30a thereof and the lower surface 5b of the lower shoulder member 5. In addition, the lower shoulder member 5 has three other vertically extending grooves 32 which are formed in the periphery thereof. The upper ends of the grooves 32 open to the lower surface 28 of the arm receiving groove 27, and the lower ends thereof do not reach the lower surface 5b of the shoulder member 5. Each of the lower surfaces 32a of the grooves 32 has a through opening 33 which provides communication between the lower surface 32a of the grooves 32 and the lower surface 5b of the lower shoulder member 5. The four through openings 31 and 33 are respectively arranged at regular intervals.

The lower shoulder member 5 has also four tapped holes 34 which open to the upper surface 5a of the lower shoulder member 5 at locations corresponding to that of through openings 31 and 33.

On the upper surface 5a of the lower shoulder member 5, an essentially cylindrical recess 35 is formed at the center thereof for causing the axis of the lower shoulder member 5 to coincide with that of the upper shoulder member 9, and an upper annular recess 36 is formed around the cylindrical recess 35 for forming the annular space 16 between the arm units 3 and 4. On the lower surface 5b of the lower shoulder member 5, an lower annular cylindrical recess 37 is formed at a location corresponding to that of the upper annular recess 36, so as to form the annular space 17 between the lower arm unit 3 and the stationary base 2. A cable passing opening 38 for establishing communication between annular recesses 36 and 37 is formed in the lower shoulder member 5.

In addition, a driving motor 39 is mounted on the lower surface 5b of the lower shoulder member 5 at the center thereof. As shown in FIG. 4, an inner space 40 is formed within the lower shoulder member 5 at a location beneath the arm receiving groove 27. In this inner space 40, an arm driving mechanism (not shown) driven by the driving motor 39 is arranged.

Structure of First Arm of Lower Arm Unit

The first pivotal arm 6 extends in a horizontal direction. Both end surfaces 6a of the first pivotal arm 6 are formed so as to be rounded. A vertically extending supporting shaft 42 passes through an opening formed in one end portion 41 of the first pivotal arm 6, and is fixed thereto. Both ends of the supporting shaft 42 are pivotably supported by ball bearings 29 mounted on top of the lower shoulder member 5. The end portion 41 of the first pivotal arm 6 is arranged within the arm receiving groove 27 of the lower shoulder member 5. The first pivotal arm 6 is designed to be rotatable in a horizontal direction about 180 degrees between a first position shown by the solid line in FIG. 3(B), in which one side surface 6b of the first pivotal arm 6 is in contact with a plane wall 43 of the arm receiving groove 27, and a second position shown by the dotted line in FIG. 3(B), in which the other side surface 6c of the first pivotal arm 6 is in contact with the plate wall 43. The supporting shaft 42 is rotated by the arm driving mechanism driven by the driving motor 39, so that the first pivotal arm 6 can rotate.

A rotating shaft 44 is pivotably supported on the free end 45 of the first pivotal arm 6, and extends downwards from the first pivotal arm 6. The rotating shaft 44 is caused to rotate by means of a driving mechanism (not shown) which is driven by a driving motor 46 fixed to the upper surface of the first pivotal arm 6.

Structures of Second Arm, Tool Mounting Shaft and so forth of Lower Arm Unit The second pivotal arm 7 also extends in a horizontal direction. The second pivotal arm 7 is slightly shorter than the first pivotal arm 6. One end portion 7a of the second pivotal arm 7 is fixed to the rotating shaft 44 extended from the first pivotal arm 6, so that the second pivotal arm 7 can rotate in a horizontal direction through rotation of the rotating shaft 44. The second pivotal arm 7 is designed to be rotatable, for example, about 290 degrees around the axis of the rotating shaft 44 connecting the second pivotal arm 7 to the first pivotal arm 6.

The tool mounting shaft 8 is rotatably supported on the free end portion 7b of the second pivotal arm 7 so as to be movable along its own axis. A tool 47 may be detachably mounted on the lower end of the tool mounting shaft 8 to be movable vertically in a direction along the axis of the shaft 8 by means of a driving mechanism 49 driven by a motor 48. The tool mounting shaft 8 is caused to rotate by means of a rotating mechanism (not shown) which is driven by a motor 50 mounted on the lower surface of the second pivotal arm 7.

A connecting cable 51 is designed to pass through the cable passing opening 38 formed in the lower shoulder member 5. Both end portions 51a and 51b are respectively drawn out of upper and lower ends of the cable passing opening 38, and connectors 52 and 53 are respectively connected to the tip of the end portions 51a and 51b.

Structure of Upper Arm Unit

Similar to the lower shoulder member 5 of the lower arm unit 3, the upper shoulder member 9 of the upper arm unit 4 is essentially cylindrical and has a similar height and diameter to that of the main body portion 18 of the stationary base 2. The upper shoulder member 9 has an upper arm receiving groove 54 which has an essentially D-shaped cross section and which is arranged at a location near the lower surface 9a of the upper shoulder member 9. As can be seen clearly from FIG. 4, a pair of essentially cylindrical bearing receiving recesses 55a are formed in the upper and lower surfaces 55 of the upper arm receiving groove 54, and a pair of ball bearings 56 are fixed in the bearing receiving recesses 55a.

The upper shoulder member 9 also has a vertically extending groove 57 which is formed in the periphery thereof at a location behind the upper arm receiving groove 54. The groove 57 is designed not to reach the upper and lower surfaces 9a and 9b of the upper shoulder member 9. The groove 57 has a bolt passing opening 58 which extends between the lower surface 57a thereof and the lower surface 9a of the upper shoulder member 9. The upper shoulder member 9 also has three cutouts 59 which are formed in the lower surface 55 of the upper arm receiving groove 54 at the periphery thereof. Each of the cutouts 59 has a bolt passing opening 60 which extends between the bottom surface thereof and the lower surface 9a of the upper shoulder member 9. The four bolt passing openings 58 and 60 are respectively arranged at regular intervals, i.e. 90 degrees.

In addition, the upper shoulder member 9 has an essentially cylindrical projection 61 which projects downwards from the center portion of the lower surface 9a of the upper shoulder member 9. The projection 61 is engageable with the recess 35 of the lower shoulder member 5 in order to cause the axis of the upper shoulder member 9 to coincide with that of the lower shoulder member 5. In order to form the annular space 16 between the lower and upper arm units 3 and 4, an annular recess 62 is formed in the lower surface 9a of the upper shoulder member 9 around the projection 61. As shown in FIG. 4, a space 63 is formed within the upper shoulder member 9 at a location above the upper arm receiving groove 54. The upper shoulder member 9 has a cable passing opening 64 which extends between the inner space 63 and the annular recess 62. An arm driving motor 65 is mounted on the upper surface 9b of the upper shoulder member 9, and an arm driving mechanism (not shown) which is driven by the arm driving motor 65 is arranged within the inner space 63.

Structure of Pivotable Arms, Tool Mounting Shaft and so forth of Upper Arm Unit Similar to the first and second pivotal arms 6 and 7 of the lower arm unit 3, the first and second pivotal arms 10 and 11 extend horizontally. The length of each of the first and second pivotal arms 10 and 11 is essentially the same as the corresponding first and second pivotal arms 6 and 7 of the lower arm unit 3. One end portion 66 of the first arm 10 is arranged within the upper arm receiving groove 54 of the upper shoulder member 9. As shown in FIG. 4, a vertically extending supporting shaft 67 passes through an opening formed in the end portion 66 and is fixed thereto. The supporting shaft 67 is pivotably supported between a pair of ball bearings 56 mounted on the bottom of the upper shoulder member 9. As a result, the first pivotal arm 10 is rotatable in a horizontal plane about 180 degrees around its axis, between a first position shown by the solid line in FIG. 3(A), in which one side surface 10a of the first pivotal arm 10 is in contact with a plane wall 68 of the upper arm receiving groove 54, and a second position shown in phantom lines in FIG. 3(A), in which the other side surface 10b of the first pivotal arm 10 is in contact with the plane wall 68.

The other end portion 70 of the first pivotal arm 10 is provided with a rotating shaft 69 which is pivotably mounted thereon, and an arm driving motor 71 to enable the rotating shaft 69 to rotate. One end portion 10a of a second pivotal arm 11 is mounted to a downward projecting portion of the rotating shaft 69, allowing the second pivotal arm 11 to rotate, for example, about 290 degrees, by means of a arm driving motor 71 which rotates the rotating shaft 69.

The tool mounting shaft 12 is rotatably supported on the free end portion 11b of the second pivotal arm 11 so as to be movable along its own axis. A tool 72 may be detachably mounted on the lower end of the tool mounting shaft 12 to be movable vertically in a direction along the axis of the shaft 12 by means of a driving mechanism 74 driven by a motor 73. The tool mounting shaft 12 is caused to rotate by means of a rotating mechanism (not shown) which is driven by a motor 75 mounted on the lower surface of the second pivotal arm 11.

A connecting cable unit 76 having a plurality of cables is designed to pass through the cable passing opening 64 formed in the upper shoulder member 9. One end portion of the connecting cable unit 76 branches into a plurality of cables, the end portions of which are respectively connected to; the motor 65 fixed to the upper surface 9b of the upper shoulder member 9, the motor 71 for causing the second pivotal arm 11 to rotate, and the motors 73 and 75 for respectively causing the tool mounting shaft 12 to move and rotate. The other end portion 76a of the connecting cable unit 76 is drawn out of the cable passing opening 64, and the end thereof is connected to a connector 77.

Assembly of Arm Unit/Units and Stationary Base

With this construction, the connecting of the upper arm unit 4 to the lower arm unit 3, and the mounting of the lower and upper arm units 3 and 4 on the stationary base 2 are performed in the following manner.

When the upper arm unit 4 is connected to the lower arm unit 3, the projection 61 which is formed on the lower surface 9a of the upper shoulder member 9 of the upper arm unit 4, is caused to engage the recess 35 which is formed in the upper surface 5a of the lower shoulder member 5 of the lower arm unit 3, so that the lower surface 9a of the upper shoulder member 9 comes into contact with the upper surface 5a of the lower shoulder member 5. Thereafter, the four bolt passing openings 58 and 60 which are formed in the upper shoulder member 9 of the upper arm unit 4, are caused to coincide with the four tapped holes 34 which are formed in the upper surface 5a of the lower shoulder member 5 of the lower arm unit 3. Then, four bolts 78 are inserted into the bolt passing openings 58 and 60, and caused to engage the tapped holes 34.

In this way, the upper shoulder member 9 is secured to the lower shoulder member 5, so that the upper and lower shoulder members 9 and 5 can be coaxially arranged. Therefore, the first pivotal arm 10 of the upper arm unit 4 can rotate around the same axis as that of the first pivotal arm 6 of the lower arm unit 3.

Furthermore, when the lower arm unit 3 is connected to the upper arm unit 4, the annular space 16 is defined by the annular recess 36 which is formed in the upper surface 5a of the lower shoulder member 5 of the lower arm unit 3, and the annular recess 62 which is formed in the lower surface 9a of the upper shoulder member 9 of the upper arm unit 4. In the annular space 16, the connector 52 of the drawn portion 51a of the connecting cable 51 of the lower arm unit 3 is connected to the connector 77 of the drawn portion 76a of the connecting cable 76 of the upper arm unit 4. Therefore, the upper drawn portion 51a of the connecting cable 51, the connector 52, the lower drawn portion 76a of the connecting cable 76 and the connector 77 can be housed in the annular space 16.

In a case where the lower arm unit 3 is mounted on the stationary base 2, the lower surface 5b of the lower shoulder member 5 of the lower arm unit 3 faces to the upper surface 18a of the main body portion 18 of the stationary base 2, and then, the four bolt passing openings 31 and 33 of the grooves 30 and 32 of the lower shoulder member 5 are so arranged as to coincide with the four tapped holes 23. Then, four bolts 79 are inserted into the bolt passing openings 31 and 33, and caused to engage the tapped holes 23. In this way, the lower shoulder member 5 is secured to the stationary base 2, and the motor 39 mounted on the lower surface 5b of the lower shoulder member 5 is housed within the motor receiving opening 20.

Furthermore, when the lower arm unit 3 is connected to the stationary base 2, the annular space 17 is defined by the annular recess 37 formed in the lower surface 5b of the lower shoulder member 5 of the lower arm unit 3, and the annular recess 22 formed in the upper surface 18a of the main body portion 18 of the stationary base. In the annular space 17, the connector 53 of the lower drawn portion 51b of the connecting cable 51 of the lower arm unit 3 is connected to the connector 26 of the upper drawn portion 25a of the connecting cable 25 of the stationary base 2. Therefore, the lower drawn portion 51b of the connecting cable 51, the connector 53, the upper drawn portion 25a of the connecting cable 25, and connector 26 can be housed within the annular space 17.

According to the above mentioned manner, the lower and upper arm units 3 and 4 can be connected to the stationary base 2, and a robot 1A with double arms can be assembled as shown in FIG. 2.

On the other hand, when only the upper arm unit 4 is mounted on the stationary base 2, the lower surface 9a of the upper shoulder member 9 of the upper arm unit 4 is caused to face the upper surface 18a of the main body portion 18 of the stationary base 2, and then the four bolt passing openings 58 and 60 which are respectively formed in the groove 57 and the cutouts 59 of the upper shoulder member 9 are caused to coincide with the corresponding tapped holes 23 formed in the main body portion 18 of the stationary base 2. Thereafter, the four bolts 78 are inserted into the bolt passing openings 58 and 60, and are caused to engage the corresponding tapped holes 23. In this way, a robot 1B with a single arm, in which only the upper arm unit 4 is mounted on the stationary base 2, can be assembled as shown in FIG. 3(A). Otherwise, another type of robot, 1C, with a single arm, in which only the lower arm unit 3 is mounted on the stationary base 2, can be assembled as shown in FIG. 3(B).

As shown in FIG. 3(B), when the robot 1C with a single arm is assembled using only the lower arm unit 3, the upper surface of the lower shoulder 5 is covered by a protector cap 80.

Therefore, a robot 1A with double arms, or single armed robots 1B or 1C can be selected on demand for an assembly line.

After a robot 1A, 1B or 1C is assembled in the above mentioned manner, the connecting cables between the motors 46 and 71 for causing the second pivotal arms 7 and 11 to rotate, the motors 48, 50, 73 and 75 for causing the tool mounting shafts 8 and 12 to rotate and move, and the controller arranged within the stationary base 2, are respectively covered by resilient protector pipes 81.

Setting of Cooperative Working Range

As mentioned above, the first pivotal arms 6 and 10, and the second pivotal arms 7 and 11 of the lower and upper arm units 3 and 4 can rotate in their respective rotating regions. In a case where a double-arm type robot 1A is assembled by using the two arm units 3 and 4, the working range of each of the lower and upper arm units 3 and 4 can be independently set by selecting the relationship between the angular orientations of the lower and upper shoulder members 5 and 9 with respect to their common axis. In addition, it is possible to optionally set a working range, in which both tools 47 and 72 of the lower and upper arm units 3 and 4 respectively, can work cooperatively, which range will be referred to as a "cooperative working range". As mentioned above, since the four bolt passing openings 58 and 60 formed in the upper shoulder member 9, and the four tapped holes 34 formed in the lower shoulder member 5 are respectively arranged at regular intervals, i.e. of 90 degrees in a direction around peripheries thereof, four orientations of the upper shoulder member 9 to the lower shoulder member 5 can be selected, so that the cooperative working range can be changed as will be described hereinafter.

Figures 7, 8A, 8B, 8C:
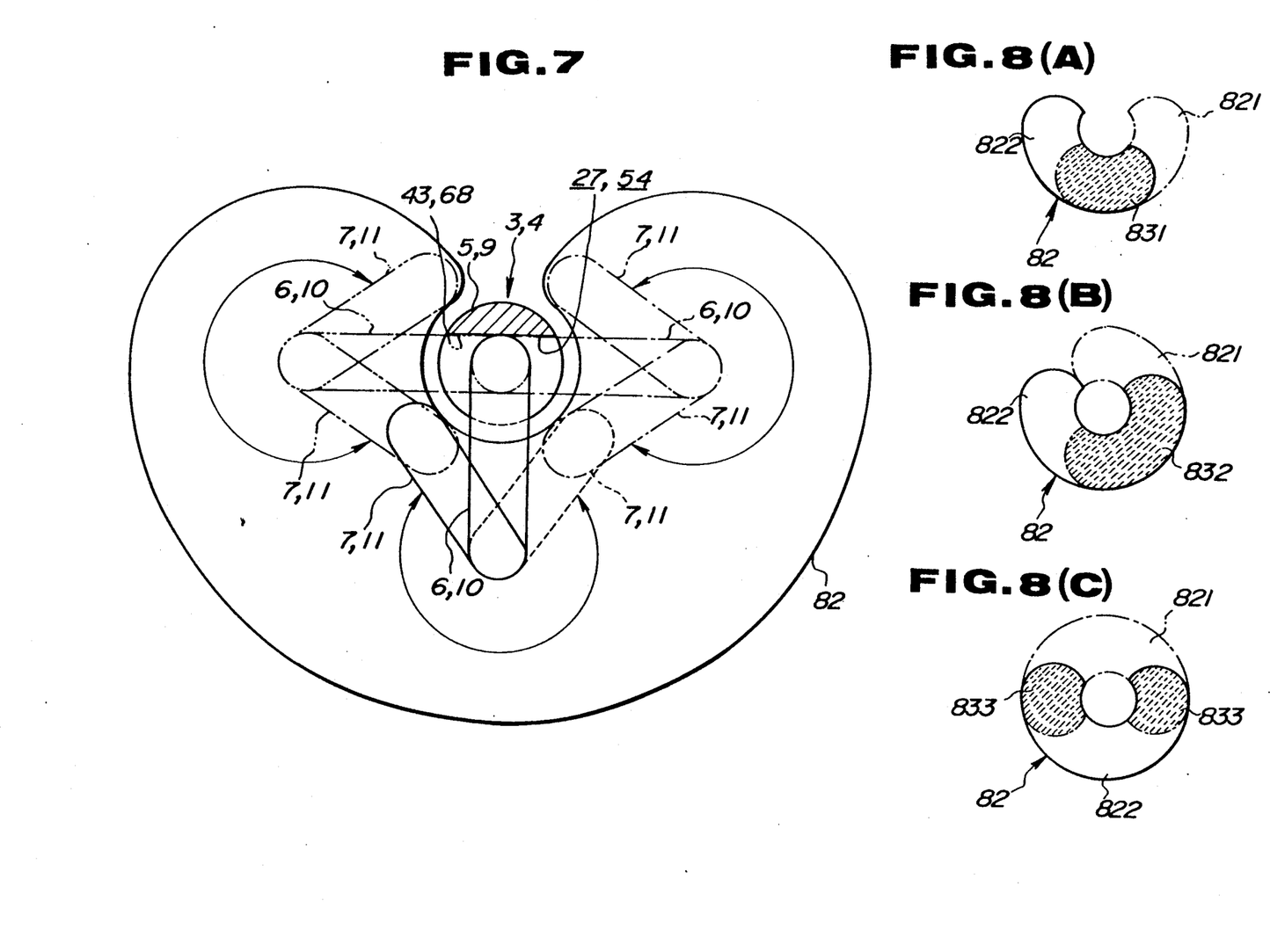
FIG. 7 is a schematic plan view illustrating the working ranges of arm units of the multi-axes robot of FIG. 1.
FIGS. 8(A), 8(B) and 8(C) are schematic views respectively illustrating the relative change of the cooperative working range of the arm units of the multi-axes robot, on the basis of changing the angular orientation of one of the arm units with respect to the other.

In FIG. 7, the curved line 82 shows the positional range of a tool mounting shaft 8 or 12 of an arm unit 3 or 4 of the single-arm type robot 1B or 1C in a horizontal direction, in other words, the working range of arm units 3 or 4. FIGS. 8(A), 8(B) and 8(C) show the relative change of the working ranges of arm units 3 and 4, and their cooperative working range, according to various orientations of the upper shoulder member 9 of upper arm unit 4 relative to the lower shoulder member 5 of the lower arm unit 3 in a direction of the axis thereof. In FIGS. 8(A), 8(B) and 8(C), the broken curved line 821 shows the working range of the lower arm unit 3, the solid curved line 822 shows the working range of the upper arm unit 4, and the darkened areas, i.e. the areas defined by the overlap of curved lines 821 and 822 and shows the cooperative working ranges of the arm units 3 and 4. These cooperative working ranges are numbered 831, 832 and 833 respectively, for FIGS. 8(A), 8(B), and 8(C).

In a case where the upper arm unit 4 of the upper shoulder member 9 is arranged at a first orientation, in which the orientation of the plane surface 68 of the upper arm receiving groove 54 parallels that of the plane surface 43 of the lower arm receiving groove 27 as shown in FIG. 1, the working ranges of one arm unit exactly coincide with the other as shown by the curved line 82 in FIG. 7, if one arm unit does not obstruct the movement of the other arm unit. In practice, one arm unit may obstruct the movement of the other arm unit in a predetermined range since the arm units may cross each other. Therefore, the actual working ranges of the arm units 3 and 4 are narrowed as shown by the curved lines 821 and 822 in FIG. 8(A), and the cooperative working range of these arm units is shown by the darkened area 831 in FIG. 8(A).

In a case where the upper shoulder member 9 of the upper arm unit 4 is arranged at a second orientation, in which the upper shoulder member 9 is rotated 90 degrees clockwise or counterclockwise from the first orientation, part of the working range of one arm unit does not coincide with that of the other arm unit. Therefore, the total working range of the two arm units is increased as shown by the curved lines 821 and 822 in FIG. 8(B), and the cooperative working range of the arm units is also increased, as shown by the darkened area 832 in FIG. 8(B).

In a case where the upper shoulder member 9 of the upper arm unit 4 is arranged at a third orientation, in which the upper shoulder member 9 is rotated 180 degrees from the first orientation, a greater working range of one arm unit will not coincide with that of the other arm unit. Therefore, the total working range of the two arm unit is increased to a full 360° as shown by the curved lines 821 and 822 in FIG. 8(C), and two cooperative working ranges are obtained as shown by the darkened areas 833 in FIG. 8(C).

In this way, in the case of a multi arm type robot, the working range of each of the arm units can be independently selected according to a user's needs by appropriately selecting the angular orientations of the shoulder members in relation to each other about the common axis thereof.

As mentioned above, the upper drawn portion 51a of the connecting cable 51, and the lower drawn portion 76a of the connecting cable 76 are arranged within the inner space 16. These drawn portions 51a and 76a have enough slack to allow the orientation of the upper shoulder member 9 to that of the lower shoulder member 5 to be changed without hindrance.

DESCRIPTION OF THE SECOND PREFERRED EMBODIMENT

Figures 9, 10:
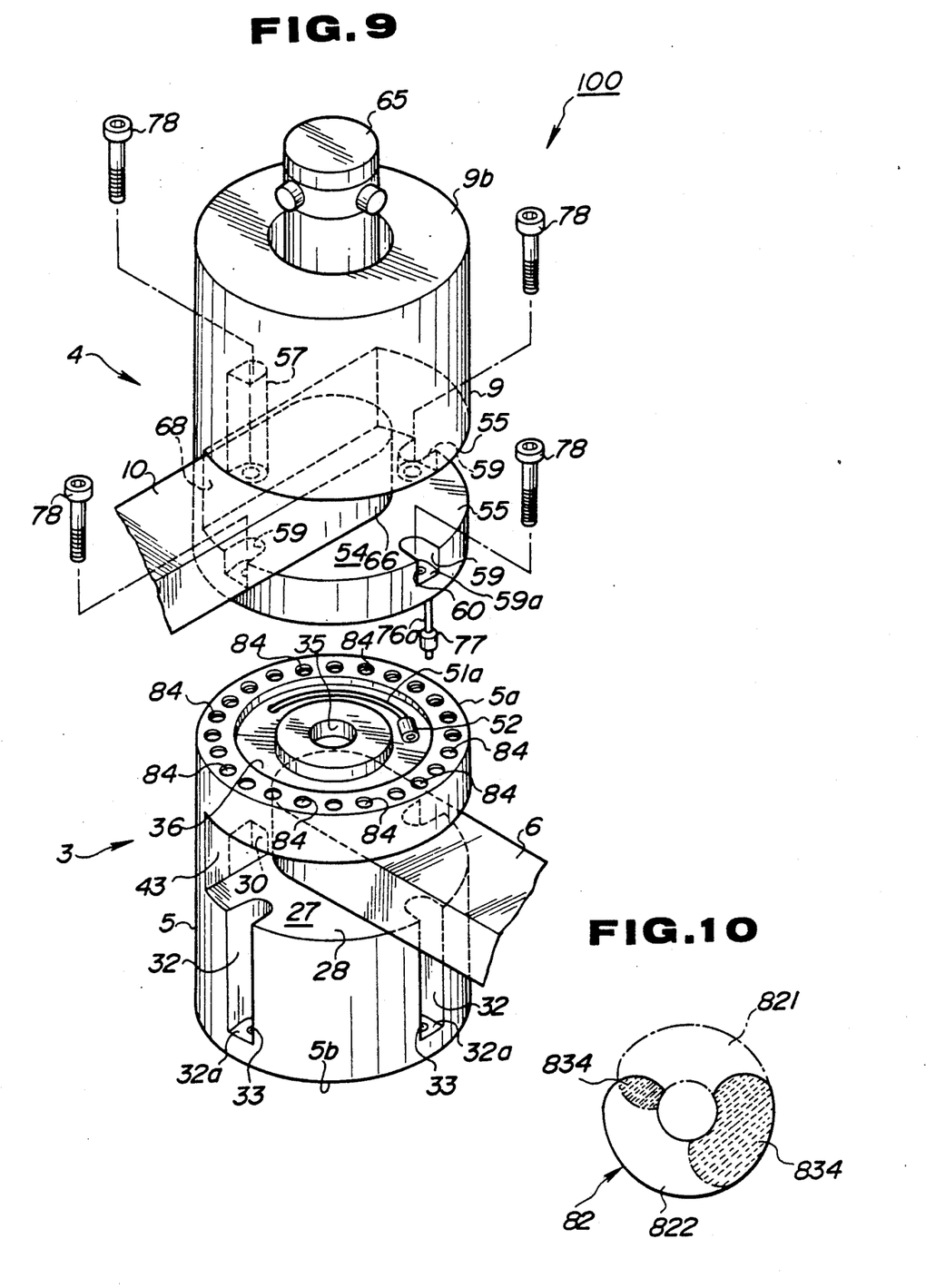
FIG. 9 is an exploded, perspective view of a main portion of a second preferred embodiment of a multi-axes type robot according to the present invention.
FIG. 10 is a schematic view illustrating relative change in the cooperative working range of the arm units of the multi-axes type robot of FIG. 9.

FIGS. 9 and 10 show a second preferred embodiment of a multi-axes robot according to the present invention.

The structure of this embodiment is the same as that of the first preferred embodiment except that the orientation of the upper shoulder member 9 to the lower shoulder member 5 can be changed at intervals of 15 degrees. Therefore, FIG. 9 shows only the main portion of the robot. In addition, only structures which are different from the previous embodiment are described below, and the descriptions of structures which are the same as that of the first preferred embodiment are omitted. With respect to the first preferred embodiment, the same reference numberings are used below.

A plurality of tapped holes 84 are formed in the upper surface 5a of the lower shoulder member 5 of the lower arm unit 3. The tapped holes 84 are arranged around the central axis at regular intervals of 15 degrees. Therefore, when the upper shoulder member 9 of the upper arm unit 4 is connected to the lower shoulder member 5 of the lower arm unit 3 according to the second preferred embodiment of the invention, the the angular orientation of the upper shoulder member 9 can be changed to a smaller degree than that of the first preferred embodiment.

FIG. 10 shows the working ranges of the arm units 3 and 4, and the cooperative working ranges thereof, in a case where the upper shoulder member 9 is rotated with respect to the lower shoulder member 5 at an angle of 135 degrees. In FIG. 10, the working ranges of the arm units 3 and 4 are shown by the curved lines 821 and 822, and the cooperative working ranges thereof are shown by the darkened area 834.

DESCRIPTION OF THE THIRD PREFERRED EMBODIMENT

Figure 11:
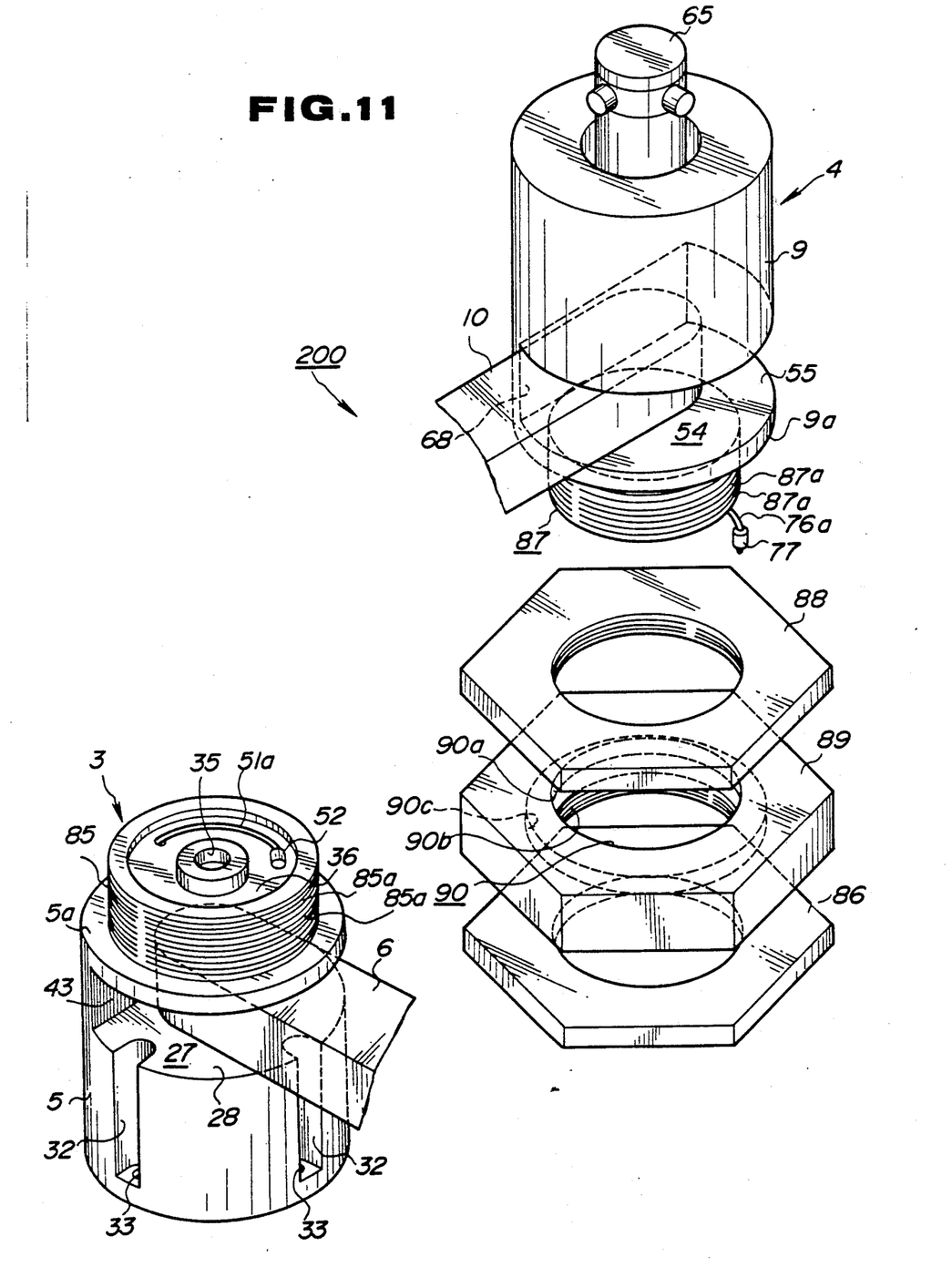
FIG. 11 is an exploded, perspective view of a main portion of a third preferred embodiment of a multi-axes type robot according to the present invention.
Figure 12:
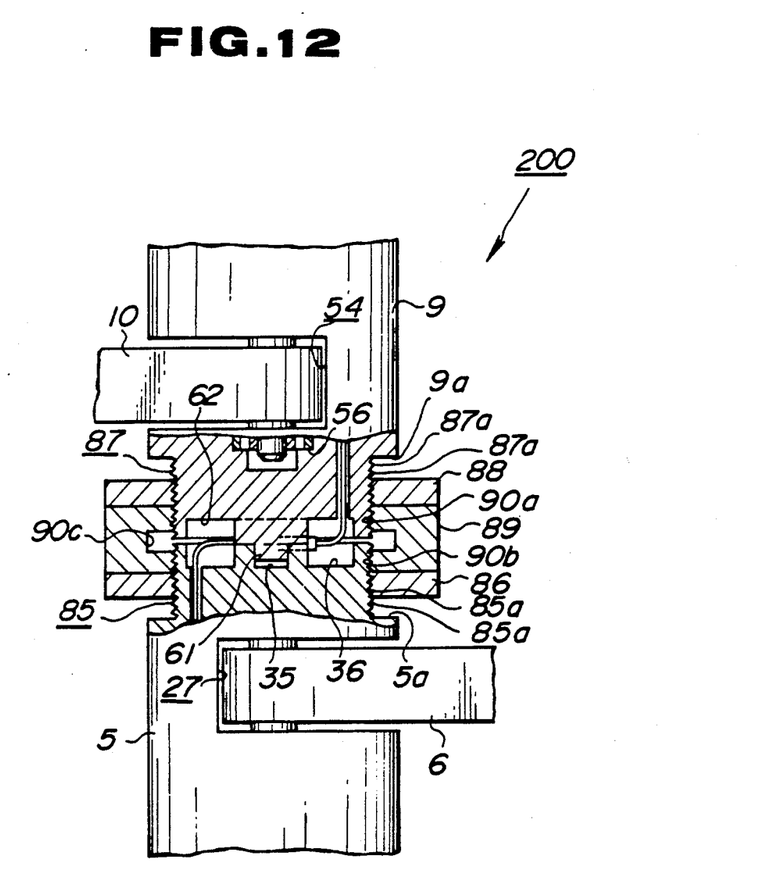
FIG. 12 is a partial side view of a main portion of the multi-axes type robot of FIG. 11.

FIGS. 11 and 12 show the third preferred embodiment of a multi-axes robot according to the present invention. The structure of this embodiment is the same as that of the first preferred embodiment except that the angular orientation of the upper shoulder member 9 to the lower shoulder member 5 is continuously variable, i.e. fine adjustment of the orientation of the upper shoulder member 9 can be performed.

In this embodiment, an essentially cylindrical connecting portion 85 is integrally formed on the lower shoulder member 5 of the lower arm unit 3. The connecting portion 85 projects vertically from the upper surface 5a of the lower shoulder member 5. On the periphery of the connecting portion 85, a spiral groove 85a serving as for example, a right-hand thread, is formed. The connecting portion 85 has a essentially cylindrical recess 35 which is arranged at the center of the upper surface thereof for causing the axis thereof to coincide with that of the upper shoulder member 9, and annular recess 36 which is arranged around the recess 35. The connecting portion 85 is engageable with a lock nut 86.

In addition, an essentially cylindrical connecting portion 87 is integrally formed on the lower surface of the upper shoulder member 9 of the upper arm unit 4. The connecting portion 87 projects vertically from the lower surface 9a of the upper shoulder member 9. On the periphery of the connecting portion 87, a spiral groove 87a serving as for example, a left-hand thread, is formed. The connecting portion 87 has essentially cylindrical projection 61 which is arranged at the center of the lower surface thereof and which is engageable with recess 35 for causing the axis thereof to coincide with that of the lower shoulder member 5, and annular recess 62 which is arranged around projection 61 for associating with annular recess 36 to define the annular space 16. The connecting portion 87 is engageable with a lock nut 88 which has a spiral groove serving, in this example, as a left-hand thread.

The connection between the upper and lower shoulder members 9 and 5 is performed by means of a connecting nut 89. On the inner wall of the connecting nut 89, a spiral groove 90 is formed. The spiral groove 90 has for example, an upper portion 90a serving as a left-hand thread, a lower portion 90b serving as a right-hand thread, and an non spiral annular groove portion 90c. The non-spiral annular groove portion 90c is arranged between the upper and lower portions 90a and 90b, and the inner diameter thereof is greater than the minor diameters of the upper and lower portions 90a and 90b. The lower portion 90b of the connecting nut 89 is engageable with the spiral groove 85a of the lower shoulder member 5 of the lower arm unit 3, and the upper portion 90a thereof is engageable with the spiral groove 87a of the upper shoulder member 9 of the upper arm unit 4.

The connecting of the lower shoulder member 5 of the lower arm unit 3 to the upper shoulder member 9 of the upper arm unit 4 is performed in the following manner.

First of all, the connecting portions 85 and 87 of the respective shoulder members 5 and 9 are respectively caused to engage the lock nuts 86 and 88, so that the end portions of the connecting portions 85 and 87 project from the lock nuts 86 and 88.

Next, the end portions of the connecting portions 85 and 87 are brought into contact with the corresponding end portions of the upper and lower portions 90a and 90b of the connecting nut 89. Then, the connecting nut 89 is caused to rotate clockwise (viewed from the top), so that the connecting nut 89 is connected to the both shoulder members 5 and 9. In this case, since one of the spiral grooves serves as a left-hand thread and another as right-handed, the connecting nut 89 can be easily connected to the both shoulder members 5 and 9 by rotating only the connecting nut 89.

Thereafter, the shoulder members 5 and 9 are caused to rotate so as to adjust the orientation between the shoulder members 5 and 9 in a direction about the axis thereof. Then, the lock nuts 86 and 88 are caused to rotate counterclockwise (as viewed from the top). In this way, the connecting nut 89 is fixed to the shoulder members 5 and 9 via lock nuts 86 and 88, so that the connection between the shoulder members 5 and 9 is completed.

By using a connecting means according to this embodiment of the present invention, the orientation of the upper shoulder member 9 of the upper arm unit 4 to the lower shoulder member 5 of the lower arm unit 3 can be incrementally adjusted, i.e. fine orientation adjustment can be performed. As a result, the cooperative working range(s) of the upper and lower arm units can be optimally selected.

As mentioned above, according to the present invention, a multi-axes robot having a plurality of arms can be assembled by connecting a plurality of arm units, since the shoulder member of one arm unit is designed to be connectable to and detachable from the shoulder member of another arm unit. In addition, if necessary, a single arm type multi-axes robot can be assembled by detaching all but one arm unit from the stationary base. Therefore, the form of the robot can be optimally changed in accordance with changes in manufacturing requirements.

According to the present invention, the working range of each of a plurality of arm units can be optimally set by appropriately selecting the angular orientation between the shoulder members of the arm units with respect to their common axis. Therefore, the cooperative working range(s) of the arm units can also be selected.

In addition, according to the present invention, wiring, lining and so forth can be easily performed when connections, detachments, orientation adjustments and so forth, of the robot are performed, since the junctions of the wires and lines can be housed within the annular space between the arm units and/or between an arm unit and the stationary base.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention as set out in the appended claims.

What is claimed is:

1. A robot comprising:
   a stationary base including at least one electrical connection cable;
   a working element equipped with a tool for performing a predetermined operation at a predetermined working position; and
   an arm unit for supporting said working element and being supported on the stationary base in such a manner as to have a fixed working range, said arm unit having at least one electrical cable for connection to said electrical connecting cable of said stationary base and having a pivotal base detachably connected at a lower surface thereof to an upper surface of the stationary base, a first arm member having one end pivotably mounted on said pivotal base, and a second arm member having one end pivotably mounted on a free end of said first arm member, said working element being mounted on a free end of said second arm member, wherein said first arm member is pivotable in an essentially horizontal direction through a predetermined angle; and further comprising
   mounting means arranged so that the working position of said arm unit is changeable by adjusting the angular orientation of said arm unit with respect to said stationary base, thereby modifying said working range, and having a plurality of engaging portions on the upper surface of said stationary base at regular intervals and surrounding a first annular recess in said upper surface housing said electrical connection cable of said stationary base, and a plurality of engaging portions on the lower surface of said pivotal base at the same regular intervals as those of said stationary base and surrounding a second annular recess in said lower surface housing said electrical cable of said arm unit, said engaging portions of the lower surface of the pivotal base being engageable with corresponding engaging portions of said stationary base, so that said arm unit is connectable to said stationary base at a plurality of angular orientations in which said first and second annular recesses are aligned to form an annular space for housing said connected electrical cables.

2. A robot as set forth in claim 1, wherein said first arm member includes first pivot means mounted so that said first arm member is pivotable about an essentially vertical first axis extending through an axis of said stationary base, and said second arm member includes second pivot means mounted so that said second arm member is pivotable about an essentially vertical second axis extending through said first arm member.

3. A robot comprising:
a stationary base;
first and second working elements each equipped with a tool for performing a predetermined operation at a predetermined working position, respectively;
a first arm unit for supporting the first working element and being supported on said stationary base; and
a second arm unit for supporting the second working element and being supported on the first arm unit;
each of said first and second arm units having a pivotal base, a first arm member having one end pivotably mounted on said pivotal base and, a second arm member having one end pivotably mounted on a free end of the first arm member and supporting a respective working element on a free end thereof, said pivotal base of said first arm unit being detachably connected to said stationary base, and said pivotal base of said second arm unit being detachably connected to said stationary base, and the pivotal base of said second arm unit being detachably connected to said first arm unit; further comprising mounting means arranged so that the angular orientations of said first arm unit with respect to said stationary base and of said second arm unit with respect to said first arm unit are adjustable, thereby changing a cooperative working range defined by an overlap of working ranges of said first and second arm units, wherein said first arm members of said first and second arm units are respectively pivotable in an essentially horizontal direction through a predetermined angle, and wherein said mounting means comprises a plurality of engaging portions on the upper surface of said stationary base at regular intervals, and a plurality of engaging portions on the lower surface of said pivotal base of said first arm unit at the same regular intervals as those of said stationary base, said engaging portions of the lower surface of said pivotal base of said first arm unit being engageable with corresponding engaging portions of said stationary base, so that said first arm unit is connectable to said stationary base at a plurality of angular orientations, and wherein said pivotal base of said first arm unit also has a plurality of engaging portions on the upper surface of said pivotal base at regular intervals, and said pivotal base of said second arm unit has a plurality of engaging portions on the lower surface of said pivotal base at respective regular intervals as those of said first arm unit, said engaging portions of said lower surface of said pivotal base of said second arm unit being engageable with corresponding engaging portions of the upper surface of said pivotal base of said first arm unit at a plurality of angular orientations with respect to the axis of said stationary base.

4. A robot as set forth in claim 3, further comprising mounting means arranged so that said first and second arm units may be detachably mounted on said stationary base.

5. A robot as set forth in claim 3, wherein said first arm members of said first and second arm units each include first pivot means arranged so that said first arm members are respectively pivotable about an essentially vertical first axis extending through an axis of said stationary base, and said second arm members of said first and second arm units each include second pivot means arranged so that said second arm are pivotable about respective, essentially vertical, second and third axes.

6. A robot as set forth in claim 3, wherein annular spaces extending about a vertical axis of said stationary base are formed at interfaces between said pivotal base of the first arm unit and said stationary base, and between said pivotal bases of said first and second arm units.

* * * * *